United States Patent [19]
Pelton

[11] 3,715,835
[45] Feb. 13, 1973

[54] ENCAPSULATING TREE SEEDLING ROOT SYSTEMS

[76] Inventor: Norman R. Pelton, 12127 York Ave., Haney, B.C., Canada

[22] Filed: Oct. 2, 1970

[21] Appl. No.: 77,553

[52] U.S. Cl. ............................. 47/58, 53/215, 47/37
[51] Int. Cl. ................................................ A01g 9/10
[58] Field of Search ................... 53/215; 47/1, 58, 37

[56] References Cited

UNITED STATES PATENTS

| | | | |
|---|---|---|---|
| 2,766,553 | 10/1956 | Wedge | 47/37 |
| 3,008,279 | 11/1961 | Weller | 53/215 |
| 2,806,326 | 9/1957 | Brusch | 47/58 |
| 3,063,197 | 11/1962 | Brooks | 47/58 |

FOREIGN PATENTS OR APPLICATIONS 79,169  6/1950

1,165,543  10/1969  Great Britain

*Primary Examiner*—Robert E. Bagwill
*Attorney*—Fetherstonhaugh and Co.

[57] ABSTRACT

A device for encapsulating the roots of a tree seedling in a clay-like mud which comprises a flexible sheet secured at one edge to a base and having a blade extending along an opposite edge. A quantity of mud is placed on the sheet, the root system of the seedling is placed on the mud and then the sheet folded to bring the blade edge close to the opposite edge to fold the mud around the seedling. The blade is then slid along the sheet, away from the edge secured to the base, to form the mud into a generally cylindrical shape around the roots.

5 Claims, 7 Drawing Figures

PATENTED FEB 13 1973
3,715,835
SHEET 1 OF 2
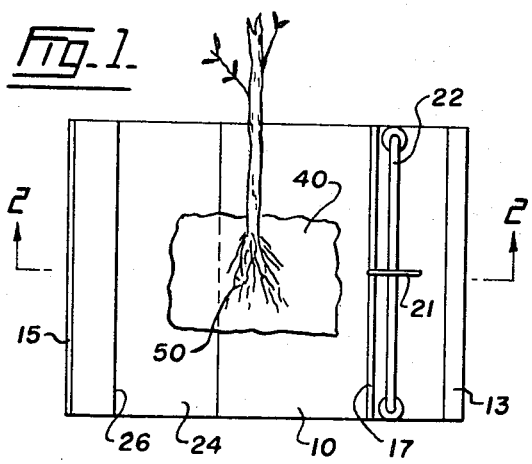
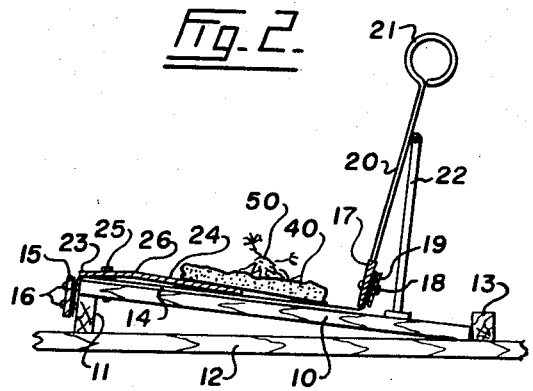
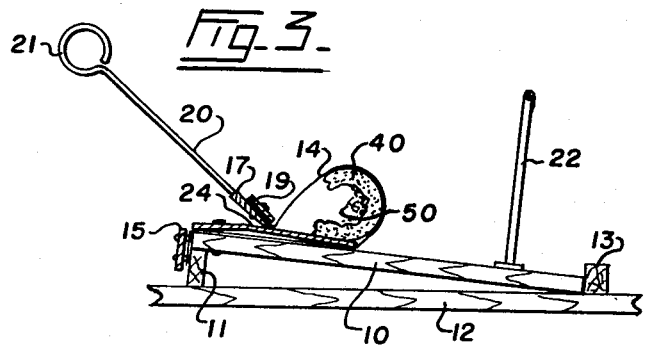
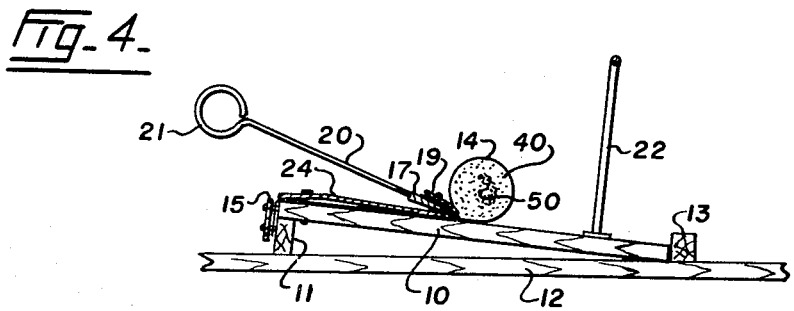
INVENTOR
NORMAN R. PELTON
BY
Fetherstonhaugh & Co.
ATTORNEYS

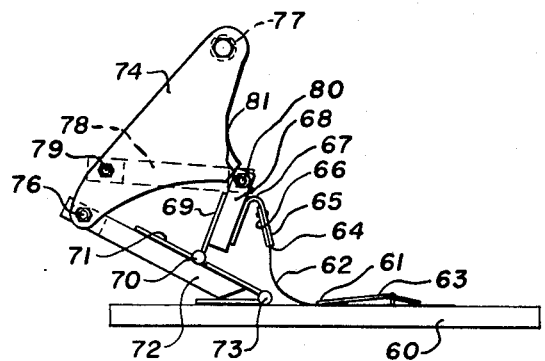

ENCAPSULATING TREE SEEDLING ROOT SYSTEMS

This invention is concerned with a device for encapsulating the roots of a tree seedling in a moist clay-like mud to ready the seedling for planting. The general method of planting seedlings with which this invention is concerned is described in my co-pending application Ser. No. 757,991 filed Sept. 6, 1968.

It has been proposed to effect the encapsulation of the roots by the use of moulds or presses, but these procedures have had disadvantages. These disadvantages or some of them can be listed as follows:

1. The mud has tended to stick to the sides of the mould or press and as the press is opened parts of the shaped mud capsule are pulled form the roots.
2. When using a mould or a press, care must be taken to ensure that the root system of the seedling is enclosed on all sides. This means that the roots must be straightened and carefully arranged within a confined area, and this operation can be difficult and time consuming.
3. A mould or press is of fixed size and the root system of seedlings varies so that in some cases where the root system is small rather more mud than is necessary is used to fill the mold or press and in others where the seedling root systems is larger insufficient mud has to be used.
4. With a two part press or mould there is a tendency for the capsule around the root system to split at the junction of the two halves of the mould or press.
5. Difficulty has been encountered in removing the encapsulated seedlings from the mould.

This invention seeks to avoid or alleviate these disadvantages. According to one aspect of this invention there is provided a device for encapsulating the root system of the tree seedling in a soft moist clay-like mud which comprises a base, a flexible sheet having one edge secured to the base, and a blade secured to its opposite edge, the arrangements being such that a quantity of mud may be placed on the sheet, and the root system of the seedling placed on the mud. The sheet is then folded by bringing the blade edge of it towards that edge secured to the base so as to fold the mud over the root system. The blade is then slid over the sheet, away from the edge secured to the base to form the mud into a generally cylindrical shape around the roots by reducing the circumference of the sheet binding the mud.

Preferably there is provided a guide plate secured to the base across which the blade is slid whilst forming the cylindrical shape and this prevents wear on the sheet.

The sheet is of a material which is durable and has a relatively smooth surface, and a convenient material is the flexible plastic sheet known by the trade mark SHELTERLITE.

Preferably the blade is secured by a linkage to the base so that it may be lifted over the mud on the sheet thus folding the sheet over the mud and then moved along the sheet away from that edge of the sheet which is secured to the base and at the same time be guided in that movement.

Embodiments of this invention are illustrated in the accompanying drawings in which:

FIG. 1 is a plan view of one embodiment of the invention,

FIGS. 2, 3 and 4 are side views of the device of FIG. 1 in different stages of its operation, FIG. 5 is a side view of another embodiment of this invention, FIG. 6 is a plan view of the embodiment of the invention illustrated in FIG. 5 and FIG. 7 is a side view of the device of FIGS. 5 and 6 showing different stages of its operation.

The device in FIG. 1 comprises a base 10 with a leg 11 secured at one end of it so that it can be supported upon a table 12 in an inclined attitude. A stop 13 is formed on the table positively to locate the device on the table and yet allow it to be removed at will.

A flexible sheet 14 of tough plastics material such as that sold under the trade mark SHELTERLITE, is secured to the base at one edge by being entrapped between the edge of the base most remote from the stop 13 and a clamping block 15 which is secured to the base by screws 16.

The end of the sheet remote from the block 15 is secured to a blade 17 by means of screws 18 passing through the blade 17 and through a clamping strip 19, the edges of the sheet being trapped between the blade 17 and the clamping strip 19.

The blade 17 has a handle 20 with a hand grip 21 and is, for convenience, supported upon a handle rest 22 fixed to the base.

The sheet 14 is clamped to the base 10 intermediate its ends by the leading edge 23 of a guide plate 24 which overlies the portion of the sheet closest to the clamping block 15 and is secured to the base by screws 25 passing through the plate 24 and the base 10. The guide plate 24 is bent as at 26 so that only the leading edge of the plate contacts the sheet.

The device is operated as follows:

Firstly, an amount of mud indicated at 40 is located generally centrally of the sheet and is patted by hand to a fairly uniform thickness. This is not a precise operation and it is done very quickly.

Then the root system of the tree seedling, indicated at 50 is lain on the mud in the manner indicated in FIGS. 1 and 2. The handle 21 is lifted to bring the blade close to the block 15 but on top of the guide plate 24. This folds the pat of mud in the manner indicated in FIG. 3. The blade is then slide along the guide plate, away from the block 15 to fold the mud around the root system as is indicated in FIG. 4. The guide plate is extended towards the block 15 so that the blade reaches the edge of the plate as the desired size of cylinder is completed. In other words the length of the plastic between the leading edge of the guide plate and the blade is approximately the circumference required of this capsule. In this way the operator knows that as the blade slips from the guide plate 24 then the required cylinder is formed. It may be desirable to provide a definite stop to limit the movement of the blade to protect the plastic sheet and so that little if any alteration is required of the operator to limit the extent to which the blade is moved to produce uniform capsultes.

The embodiment of the invention illustrated in FIGS. 5 to 7 comprises a base 60 to which an edge 61 of a tough, flexible plastic sheet 62 is secured by means of a guide plate 63 in much the same fashion as the sheet 14 of the embodiment of FIGS. 1 through 4 is secured to base 10.

The edge 64 of sheet 62 opposite to the edge 61 is secured to a blade 65 by a clamping strip 66. The blade is formed by one limb of a generally V-sectioned plate indicated at 67, the other limb of which is secured by screws to a support plate 68 which in turn is secured to one leaf 69 of a leaf hinge 70. The other leaf 71 of the hinge 70 is secured to a board 72 which is pivotally secured by a hinge 73 to the base 60.

At the end of the board 72 remote from its pivotal connection to the base are a pair of operating levers 74 mounted upon a pivot pin 75 which extends beyond the edges of the board. The ends of the pins 75 beyond the edges of the board are screw-threaded to receive nuts 76 and washers to secure the pin and allow pivotal movement of the levers 74 thereupon.

A hand grip 77 interconnects the free ends of the lever 74 i.e. those ends of the levers remote from the pins 75. Most desirably to avoid blistering an operator's hands this grip is made to be rotatable about its axis.

Intermediate the hand grip 77 and the pin 75 a link 78 is pivoted upon a pin 79 which extends between the two levers 74. The end of the link remote from the pin 79 is pivoted to the support plate 68 by a pin 80.

To operate the device illustrated in the Figures first a quantity of mud is located upon the sheet 62 and then the root system of a seedling is located upon the mud. The handgrip is grasped and lifted to the position shown in full line in FIG. 7 and lowered so that it contacts the upper surface of the strip 63 which overlies the position at which the sheet is clamped thus folding the sheet 62 around the mud. The handgrip is then pushed downwardly and forwardly to the position shown in chaindot line in FIG. 7 thus pressing the mud firmly around the tree seedling in the manner of the device in FIGS. 1 to 4.

The levers 74 are preferably shaped to provide stop surfaces 81 which co-operate with the edges of link 68 or another convenient abutment to limit the extent to which the blade can be moved towards the pin 73 so that an operator need only move the handgrip until the stop meets the abutment to be sure that a capsule of the required nominal size is produced.

Also the stop prevents damage to the plastic sheet which might occur if the blade was to move beyond the edge 61 of plate 63.

Both of the arrangements described and illustrated in the drawings have several advantages over the use of moulds and presses. Both the items are inexpensive to produce and simple and quick to operate and can be manipulated with one hand leaving the other free to position the seedling and to remove excess mud which might reach the lateral edges of the sheet. Also the operator can give each capsule produced an immediate inspection and if need be make repairs or improvements at that time simply by adding extra mud where need be and repeating the pressing operation.

The embodiment in FIGS. 1 to 4 is simpler than that in FIG. 5 and thus has the advantage of being cheap to produce relatively to the embodiment of FIG. 5. On the other hand, the embodiment of FIGS. 1 to 4 requires that the operator exert force with his or her wrist to hold the blade parallel to the edge of the sheet which is secured to the base. This is not the case with the embodiment of FIGS. 5 through 7 which has a much more positive action by being guided by the linkage. Additionally the mechanical advantage afforded by the linkage greatly reduces the effort required of the operator to form the capsules.

With each arrangement the seedling roots are safe from damage because the pressure required is clearly adjustable at the will of the operator and in fact very little pressure is needed. Additionally oversized cylinders or capsules of can be formed as required according to the size of the root system of the seedling by moving the blade to a lesser extent away from the edge of the sheet which is secured to the base.

It will of course be appreciated that there are other linkages which could be used to effect the action of the embodiment of FIGS. 5 through 7. For example there could be a simple lever carrying the blade which is slidable along a pivot at the free end of a lever which is in turn pivoted to the base. Such variations do not deviate from the scope of this invention as defined in the claims appended hereto.

I claim:

1. A device for encapsulating the root system of a tree seedling in a capsule of soft, moist, clay-like mud, said device comprising, a base, a flexible sheet secured by one edge to the base and a blade secured to an opposite edge of the sheet, the spacing between said one edge of the sheet and the edge to the blade being at least approximately equal to the required circumference of the capsule, and the base including means defining a guide surface contiguous with said one edge so that the sheet may be folded and the blade slid along the guide surface to form an layer of mud on the sheet into a capsule around the root system of a seedling set on the mud.

2. A device as claimed in claim 1 which comprises a guide plate defining said guide surface and overlying a portion of the sheet extending from its connection to the base to form a guide surface over which the blade may be slid.

3. A device as claimed in claim 1 in which said blade is mounted upon a mechanical linkage pivotally connected to the base.

4. A device as claimed in claim 3 in which said linkage comprises a first lever pivotally connected to the base, a second lever pivoted to the end of the first lever remote from the base and having a hand grip, a third lever pivoted to said first lever intermediate its connection to the base and its pivotal connection to the second lever, and a fourth lever interconnecting the end of the third lever remote from its connection to the first lever and a point on the second lever intermediate its free ends and its connection to said first lever, said third lever supporting said blade, and said blade having an edge parallel to the pivot axis of said linkage.

5. A method of encapsulating the root system of a tree seedling in a capsule of soft, moist, clay-like mud, comprising the steps of locating a layer of the mud on a flexible sheet, locating the root system of the seedling upon the mud, forming a fold in the sheet to cause the mud layer thereon to be wrapped around the root system, manipulating the sheet to progressively reduce the volume enclosed by the fold therein without generating substantial rolling action of the mud, so as to compress the mud within the fold and completely encapsulate the root system and thereafter peeling the sheet from the resultant encapsulated seedling root system.

* * * * *